(12) United States Patent
Hoffman et al.

(10) Patent No.: US 8,448,020 B2
(45) Date of Patent: May 21, 2013

(54) METHOD AND APPARATUS FOR DISPERSED STORAGE MEMORY DEVICE SELECTION

(75) Inventors: Steven Mark Hoffman, Chicago, IL (US); Jason K. Resch, Chicago, IL (US); Gary W. Grube, Barrington Hills, IL (US); Timothy W. Markison, Mesa, AZ (US)

(73) Assignee: Cleversafe, Inc., Chicago, IL (US)

( * ) Notice: Subject to any disclaimer, the term of this patent is extended or adjusted under 35 U.S.C. 154(b) by 0 days.

(21) Appl. No.: 13/524,346

(22) Filed: Jun. 15, 2012

(65) Prior Publication Data

US 2012/0254697 A1 Oct. 4, 2012

Related U.S. Application Data

(63) Continuation of application No. 12/778,663, filed on May 12, 2010.

(60) Provisional application No. 61/247,190, filed on Sep. 30, 2009.

(51) Int. Cl.
*G06F 11/08* (2006.01)
*G06F 11/00* (2006.01)

(52) U.S. Cl.
USPC ............. 714/6.24; 714/6.1; 714/6.2; 714/6.3; 714/42; 714/54

(58) Field of Classification Search
USPC .................... 714/6.1, 6.2, 6.24, 6.3, 6.31, 20, 714/42, 54; 711/114, 154, 163
See application file for complete search history.

(56) References Cited

U.S. PATENT DOCUMENTS

| | | | |
|---|---|---|---|
| 7,933,876 B2* | 4/2011 | de la Torre et al. | 707/687 |
| 2007/0079083 A1* | 4/2007 | Gladwin et al. | 711/154 |
| 2009/0094250 A1* | 4/2009 | Dhuse et al. | 707/10 |
| 2010/0023529 A1* | 1/2010 | Gladwin et al. | 707/10 |

* cited by examiner

*Primary Examiner* — Joseph D Manoskey
(74) *Attorney, Agent, or Firm* — Garlick & Markison; Timothy W. Markison

(57) ABSTRACT

A method begins when a dispersed storage (DS) processing unit of a DS unit has at least one of DS unit operational data and DS unit operating system algorithm to store. The method continues with the DS processing unit encoding at least a portion of the at least one of DS unit operational data and DS unit operating system algorithm in accordance with an error coding dispersal storage function to produce a plurality of data slices. The method continues with the DS processing unit storing at least some of the plurality of data slices in memory devices of the DS unit in accordance with the error coding dispersal storage function.

15 Claims, 10 Drawing Sheets computing system 10

METHOD AND APPARATUS FOR DISPERSED STORAGE MEMORY DEVICE SELECTION

CROSS REFERENCE TO RELATED PATENTS

This patent application is claiming priority under 35 USC §120 as a continuing patent application of co-pending patent application entitled METHOD AND APPARATUS FOR DISPERSED STORAGE MEMORY DEVICE SELECTION, having a filing date of May 12, 2010, and a Ser. No. 12/778,663, which is incorporated herein by reference in its entirety for all purposes and which claims priority under 35 USC §119(e) to a provisionally filed patent application entitled DISTRIBUTED STORAGE NETWORK MEMORY UTILIZATION, having a provisional filing date of Sep. 30, 2009, and a provisional Ser. No. 61/247,190, which is incorporated herein by reference in its entirety for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

DETAILED DESCRIPTION OF THE INVENTION

Figure 1:
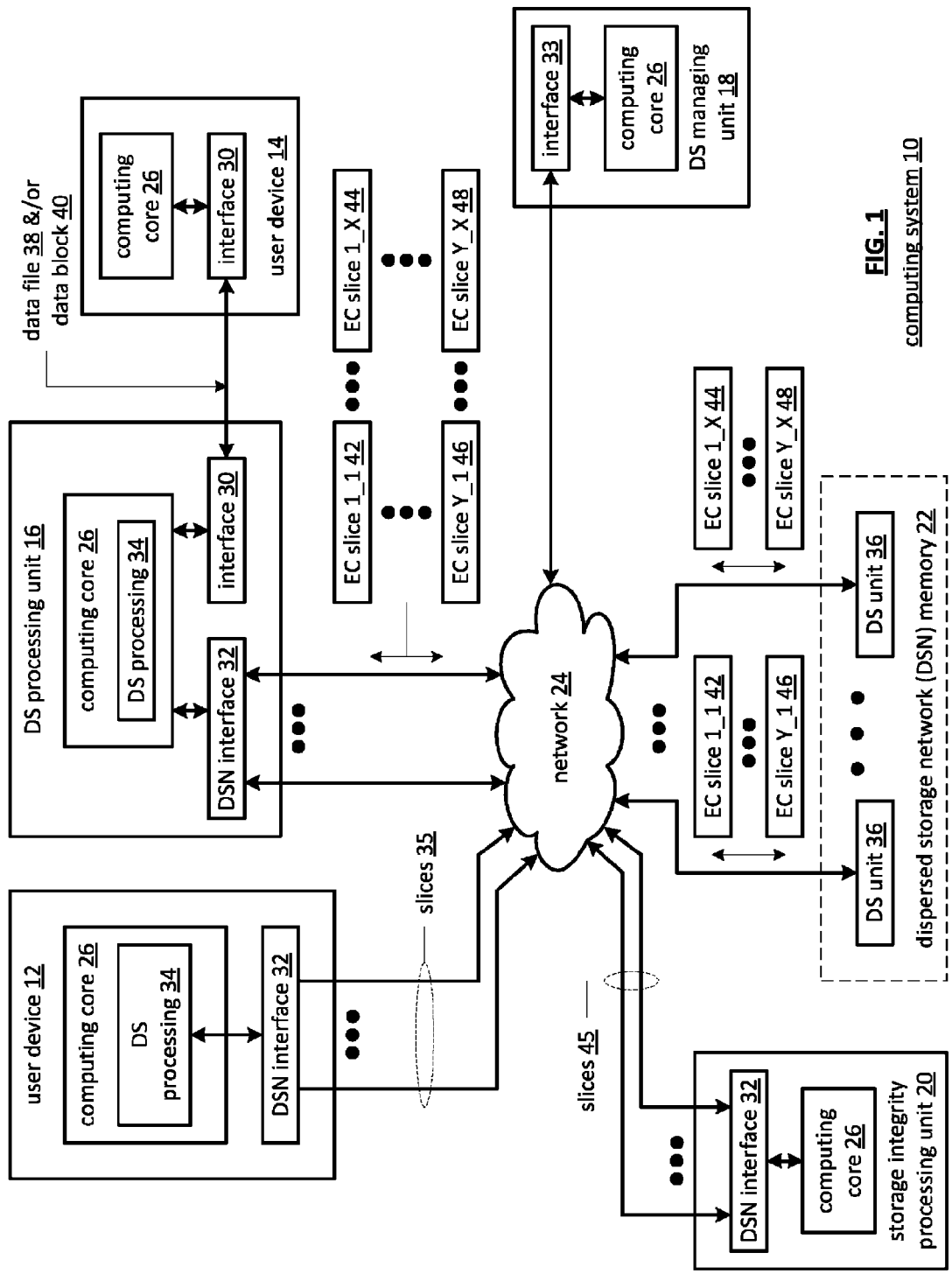
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-9.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-9.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 35 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
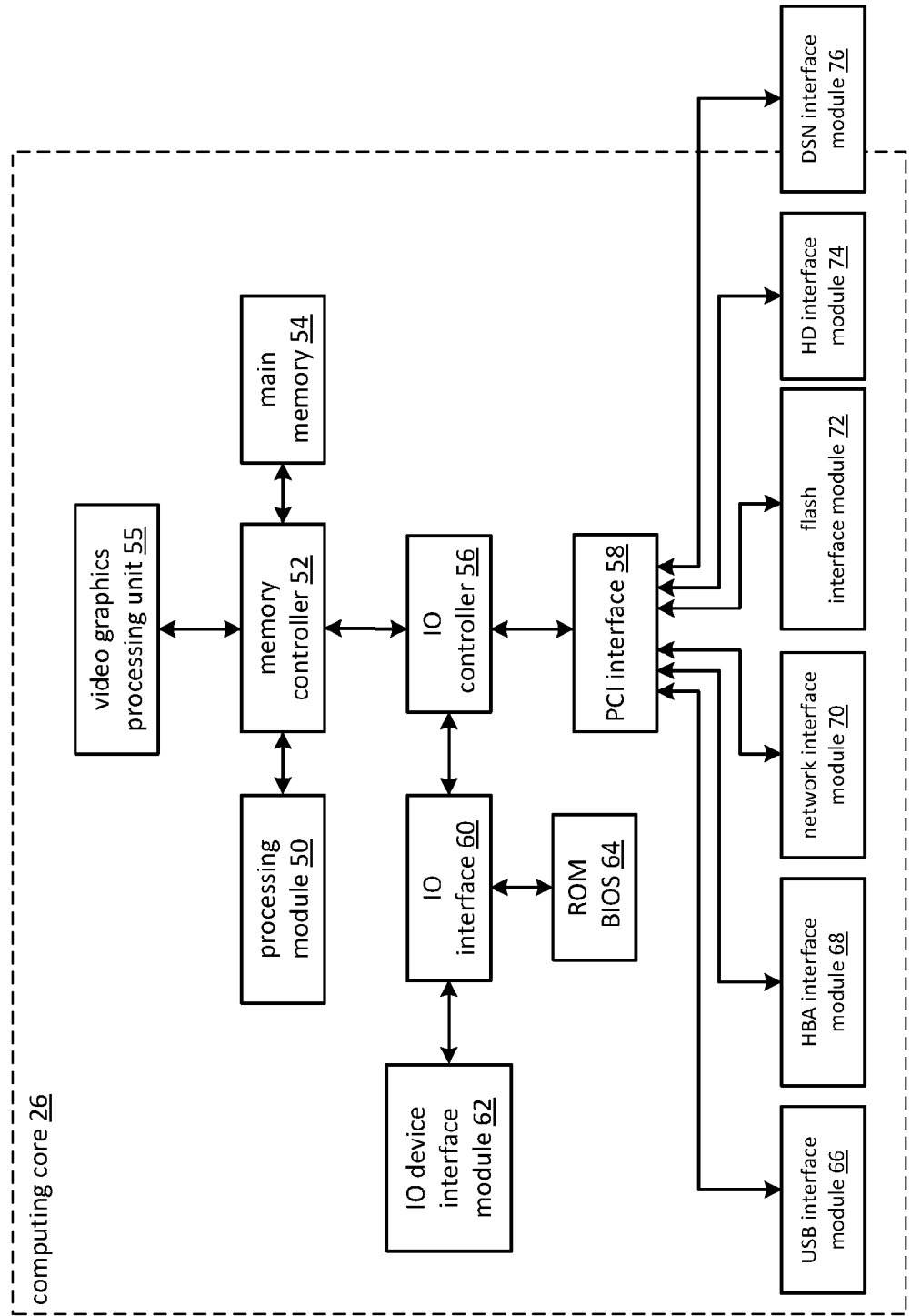
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-9.

Figure 3:
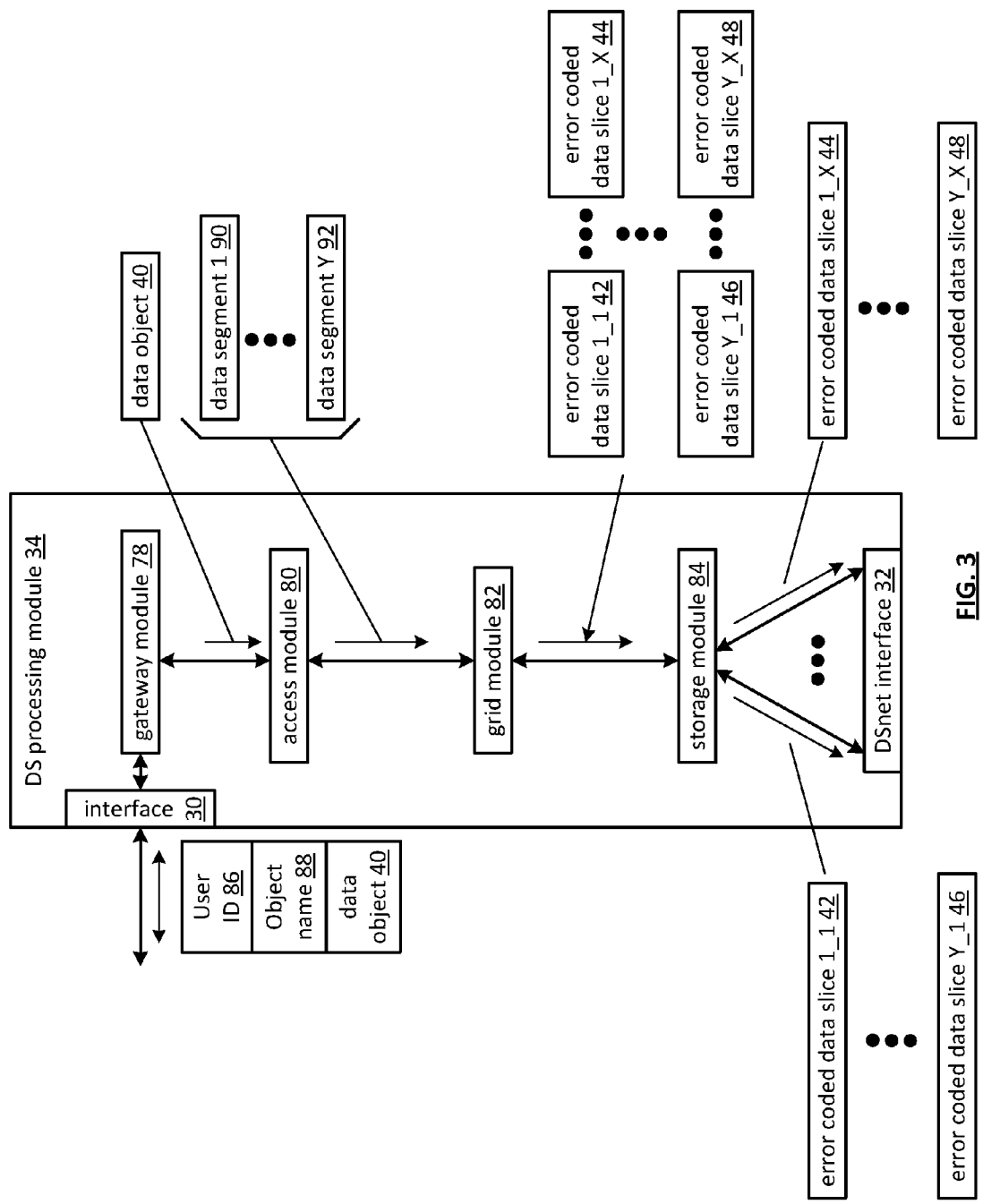
FIG. 3 is a schematic block diagram of an embodiment of a distributed storage processing module in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78.

In an example of storing data, the gateway module 78 receives an incoming data object (e.g., a data file, a data block, an EC data slice, etc.) that includes a user ID field 86, an object name field 88, and the data field 40. The gateway module 78 authenticates the user associated with the data object by verifying the user ID 86 with the managing unit 18 and/or another authenticating unit. When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, an encryption algorithm, a slicing parameter, a compression algorithm, an integrity check method, caching settings, parallelism settings, and/or other parameters that may be used to access the DSN memory layer.

The gateway module uses the user information to assign a source name to the data. For instance, the gateway module 60 determines the source name of the data object 40 based on the vault identifier and the data object. For example, the source name may contain a data name (block number or a file number), the vault generation number, the reserved field, and the vault identifier. The data name may be randomly assigned but is associated with the user data object.

The access module 62 receives the data object 40 and creates a series of data segments 1 through Y 90-92 therefrom. The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the source name.

The grid module 82 may pre-manipulate (e.g., compression, encryption, cyclic redundancy check (CRC), etc.) each of the data segments before performing an error coding function of the error coding dispersal storage function to produce a pre-manipulated data segment. The grid module 82 then error encodes (e.g., Reed-Solomon, Convolution encoding, Trellis encoding, etc.) the data segment or pre-manipulated data segment into X error coded data slices 42-44. The grid module 64 determines a unique slice name for each error coded data slice and attaches it to the data slice.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

The grid module 82 also determines which of the DS storage units 36 will store the EC data slices based on a dispersed storage memory mapping associated with the user's vault and/or DS storage unit 36 attributes. The DS storage unit attributes includes availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the EC data slices and, when successful, transmits the EC data slices 1 through X of each segment 1 through Y to the DS Storage units. Each of the DS storage units 36 stores its EC data slice and keeps a table to convert the virtual DSN address of the EC data slice into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
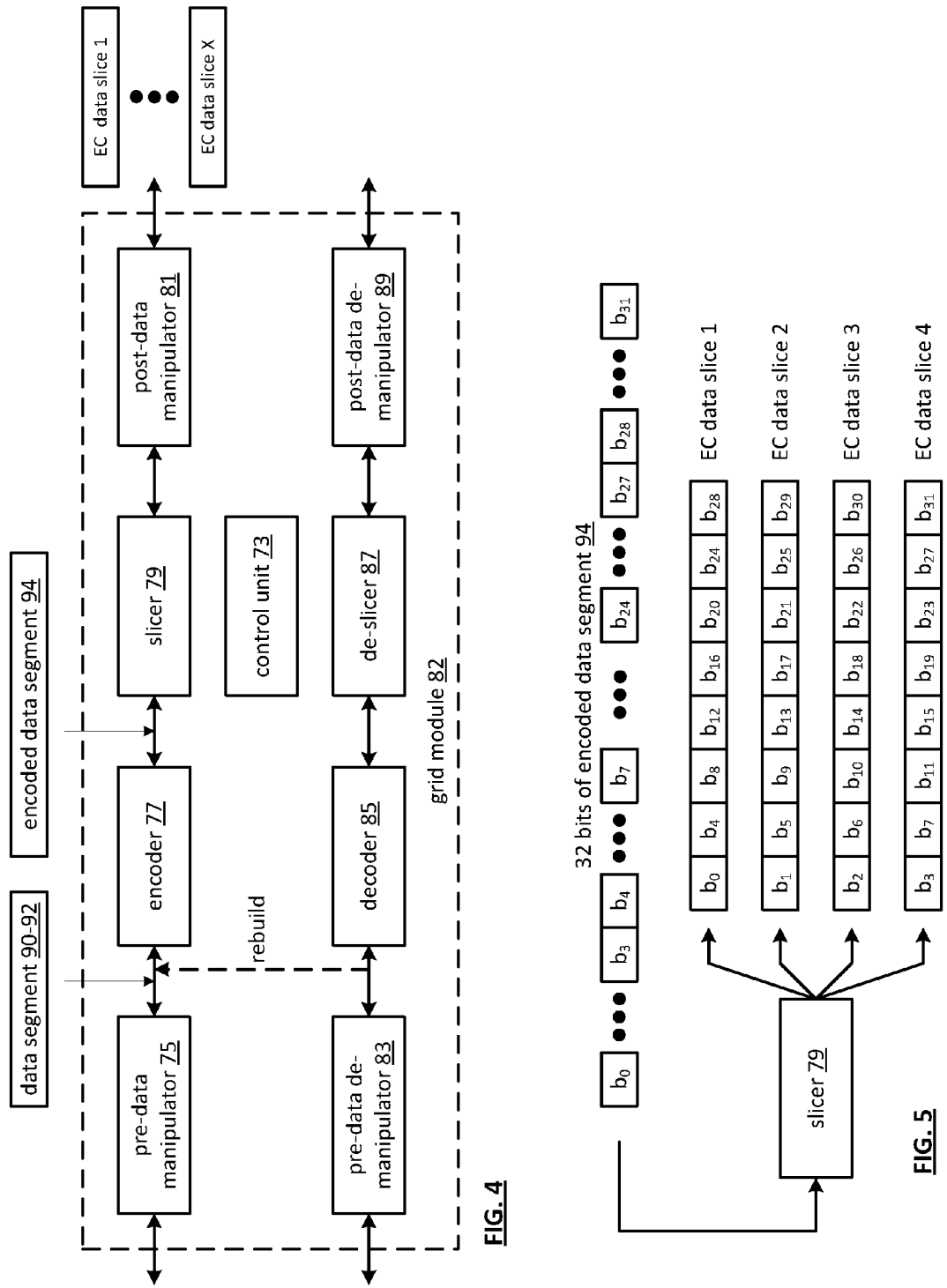
FIG. 4 is a schematic block diagram of an embodiment of a grid module in accordance with the invention.
FIG. 5 is a diagram of an example embodiment of error coded data slice creation in accordance with the invention.

FIG. 4 is a schematic block diagram of an embodiment of a grid module 82 that includes a control unit 73, a pre-data manipulator 75, an encoder 77, a slicer 79, a post-data manipulator 81, a pre-data de-manipulator 83, a decoder 85, a de-slicer 87, and/or a post-data de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-data manipulator 75 receives a data segment 90-92 and a write instruction from an authorized user device. The pre-data manipulator 75 determines if pre-manipulation of the data segment 90-92 is required and, if so, what type. The pre-data manipulator 75 may make the determination independently or based on instructions from the control unit 73, where the determination is based a computing system-wide predetermination, a table lookup, vault parameters associated with the user identification, the type of data, security requirements, available DSN memory, performance requirements, and/or other metadata.

Once a positive determination is made, the pre-data manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of $d*(X/T)$, where d is size of the data segment 92, X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer slices each encoded data segment 94 into 16 encoded slices.

The post-data manipulator 81 performs, if enabled, post-manipulation on the encoded slices to produce the EC data slices. If enabled, the post-data manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-data manipulation may include slice level compression, signatures, encryption, CRC, addressing, watermarking, tagging, adding metadata, and/or other manipulation to improve the effectiveness of the computing system.

In an example of a read operation, the post-data de-manipulator 89 receives at least a read threshold number of EC data slices and performs the inverse function of the post-data manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-data de-manipulator 83 performs the inverse function of the pre-data manipulator 75 to recapture the data segment.

FIG. 5 is a diagram of an example of slicing an encoded data segment 94 by the slicer 79. In this example, the encoded data segment includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
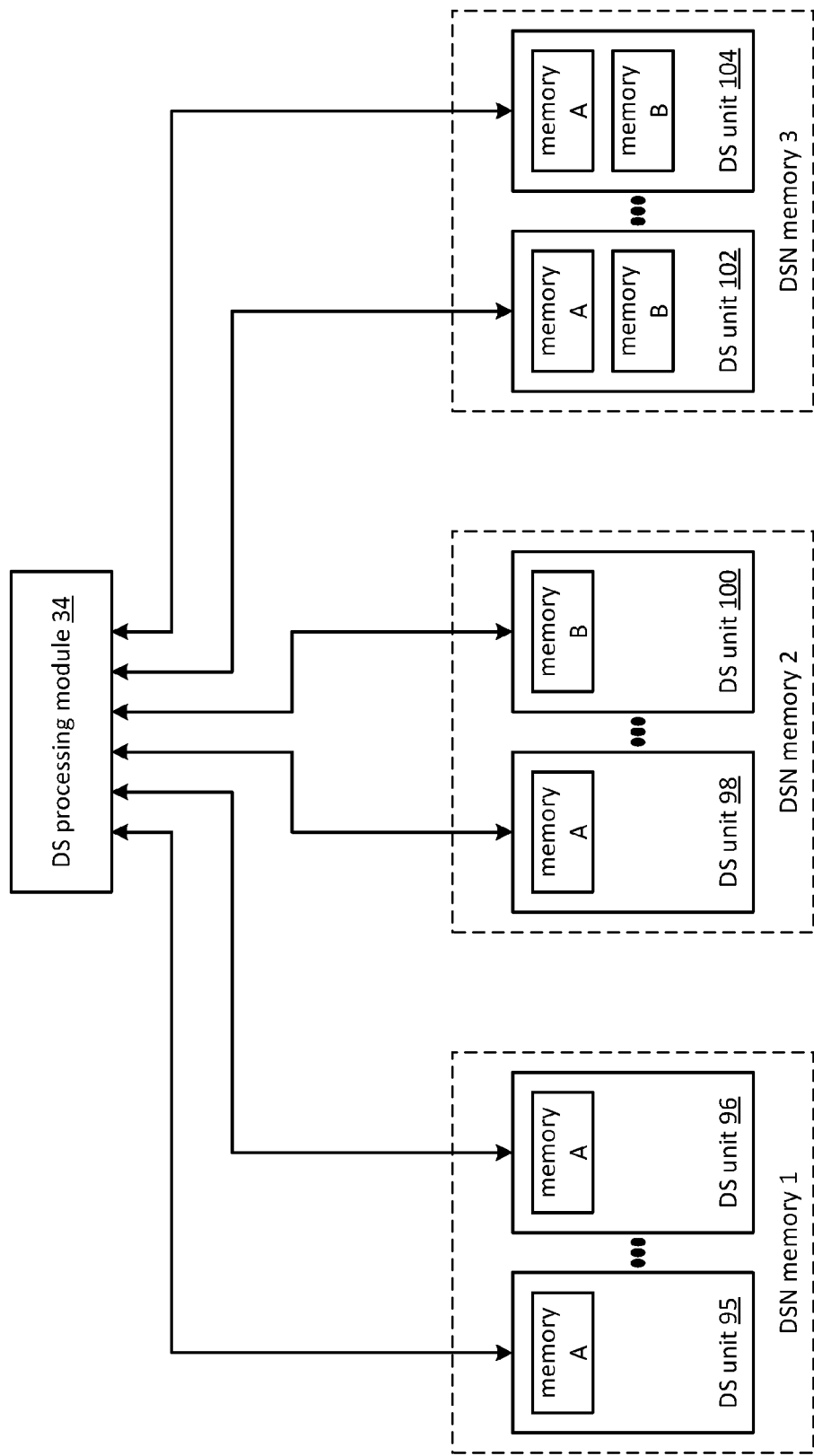
FIG. 6 is a schematic block diagram of another embodiment of a computing system in accordance with the invention.

FIG. 6 is a schematic block diagram of the DS processing module 34 operably coupled (e.g., via one or more networks) to a plurality of DSN (dispersed storage network) memory sites (e.g., a DSN memory 1, a DSN memory 2, and a DSN memory 3) of the DSN memory 22. In this example, DSN memory site 1 includes one or more DS units 95-96 utilizing a memory A; DSN memory site 2 includes at least one DS unit 98 utilizing the memory A and at least one DS unit utilizing a memory B 100; and DSN memory site 3 includes at least one DS unit 102-104 utilizing the memory A and the memory B. Memory A and memory B have different memory characteristics, which are known to the DS processing module 34 and/or to the DS units 95-104. The memory characteristics may include speed of access, cost, reliability, availability, capacity and other parameters. Note that DS units 95-104 correspond to DS units 36 of FIG. 1.

In an example of operation, the DS processing module 34 has a data object to store and determines (e.g., looks up, receives, retrieves from memory, etc.) storage metadata for the data object. The storage metadata includes storage requirements for the data object. The storage requirements include one or more of: a file type, file size, priority, security index, estimated storage time, estimated time between retrievals and more.

The DS processing module 34 then determines (e.g., looks up, receives, retrieves from memory, etc.) memory device capabilities of the DSN memory 22. The memory device capabilities include a memory device storage cost, a memory device storage access speed, a memory device storage reliability, a memory device storage availability, and/or a memory device storage capacity. In this example, memory A has different memory device capabilities than memory B. For example, memory B may have a faster access speed than memory A.

The DS processing module 34 then identifies memory devices of the DSN memory based on the memory device capabilities and the storage metadata to produce identified memory devices. For example, the DS processing module 34 interprets the storage requirements of the metadata and attempts to match the requirements with the memory device capabilities. As a specific example, if the data object has a storage requirement for a fast access time, then the DS processing module would identify memory B for storage (as opposed to memory A in this example, which has a slower access time).

The DS processing module then encodes the data into a plurality of data slices in accordance with an error coding dispersal function and outputs the data slices to the identified memory devices for storage. For example, the slices are outputted to DS units 100-104 for storage in memory B.

In another example of operation, the DS processing unit 16 considers moving the previously stored data object and may choose to move the data object slices from one memory type to another (e.g., from memory B to memory A). In this instance, the DS processing module 34 interprets the storage metadata, which indicates that a fast data retrieval is no longer required, and initiates the data transfer. The data transfer may be a straight transfer of the data slices from memory B to memory A, or may be done by reconstructing the data object from the slices in memory B, re-encode the reconstructed data object using the same or different operational parameters of the error coding dispersal storage function to produce reconstructed slices, and storing the reconstructed slices in memory A.

Figure 7:
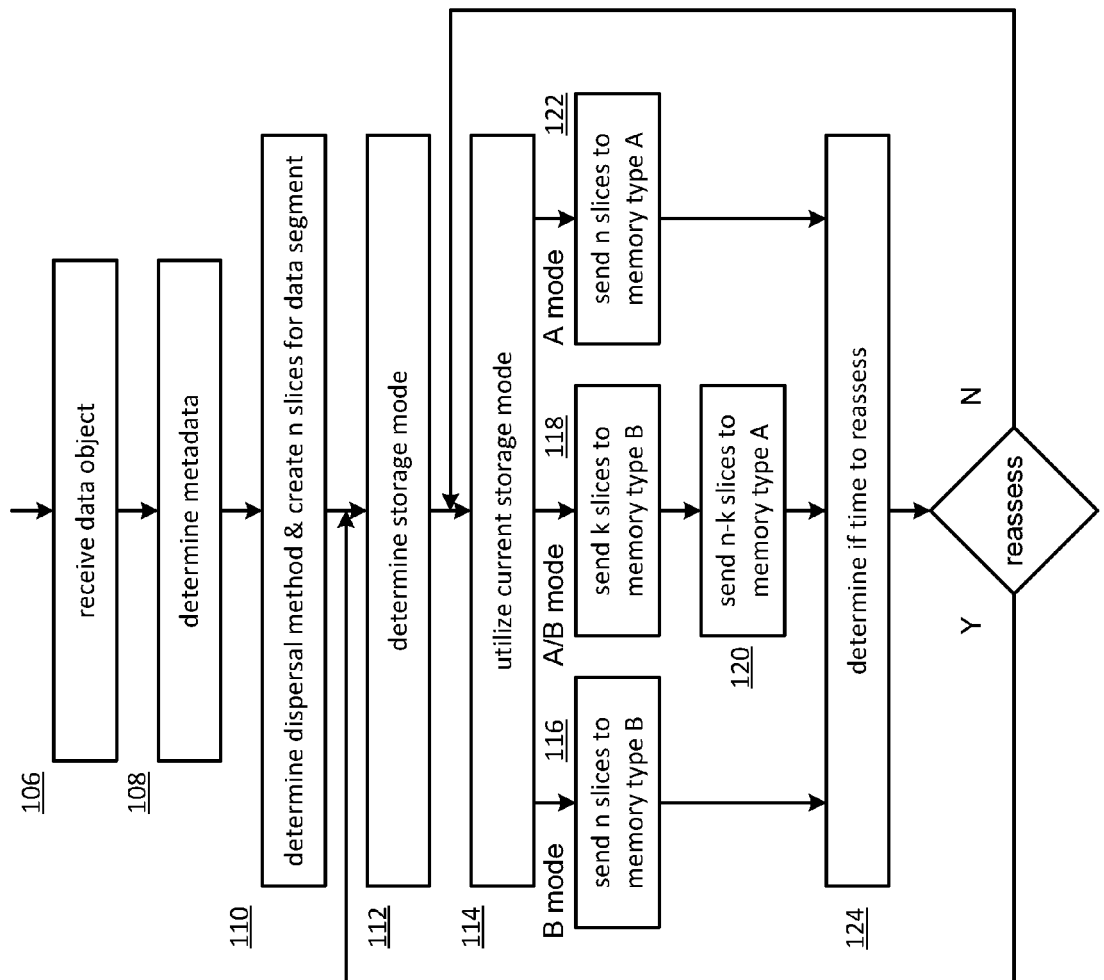
FIG. 7 is a flowchart of an embodiment of a method for determining data distribution in accordance with the present invention.

FIG. 7 is a flowchart illustrating the determination of a data distribution method where the DS processing unit may choose the memory, create the slices, and send the slices for storage to the chosen memory. The method begins at step 106 where the DS processing module receives a data object from a source (e.g., a user device, the storage integrity processing unit, another DS processing unit, the DS unit, and/or the DS managing unit).

The method continues at step 108 where the DS processing module determines the storage metadata (e.g., a file type, file size, priority, security index, estimated storage time, estimated time between retrievals, etc.) associated with the data object. Such a determination is based on one or more of the data, information received with the data, information derived from generation of the data, a command, a message, and/or a predetermination. Alternatively, or in addition to, the determination may be based on segmenting the data in accordance with an error coding dispersal function to produce a plurality of data segments followed by subsequent determination of the storage metadata based on at least one of the plurality of data segments. As yet another alternative or addition, the determination may be based on partitioning the data based on customized data content (e.g., user preferences and/or files) and generic data content (e.g., a commonly available application) to produce a customized data partition and a generic data partition followed by the subsequent determination of customized data partition storage metadata regarding the customized data partition and generic data partition storage metadata regarding the generic data partition followed by aggregation of the customized data partition storage metadata and the generic data partition storage metadata to produce the storage metadata.

The method continues at step 110 where the DS processing unit determines a storage dispersal method (e.g., operational parameters for an error coding dispersal storage function). The operational parameters include one or more of: a pillar width, a read threshold, an error coding algorithm, an encryption algorithm, a slicing parameter, a compression algorithm, an integrity check method, a caching settings, and a parallelism settings. Within step 110, the DS processing module encodes the data segment in accordance with the storage dispersal method to produce a plurality of error coded data slices (which may also be referred to as data slices or slices). For example, the metadata may require high reliability and fast retrieval speeds for a near term time period. In this example, the DS processing unit would select a storage dispersal method to include a low number pillars (e.g., X) using a certain type of memory device to speed subsequent retrieval.

The method continues at step 112 where the DS processing module determines a storage mode based on the metadata and memory capabilities of the DSN memory. The storage mode includes a memory selection and may further include a time phase indicator. The time phase indicator specifies one or more time intervals for a given set of storage requirements. For example, the time phase indicator specifies a first time phase that corresponds to a time period from the initial storage of the new data object and second time phase that corresponds to the time period after the first time phase expires. As a specific example, the DS processing unit determines the storage mode to be a B mode (e.g., fast reliable and costly solid state memory) for the first time phase and storage mode A for the second time phase.

The DS processing module may also determine the storage mode based on the type of data. For example, the data may include customized data content (e.g., user preferences and/or files) and/or generic data content (e.g., a commonly available application). In this example, the generic data content may have one type of storage mode (e.g., slower, less reliable, etc.), while the customized data content may have another type of storage mode (e.g., faster, more reliable, etc.).

The method continues at step 114 where the DS processing unit utilizes the current storage mode to store slices in the DSN memory. In this instance, the DS processing unit looks up the mapping in the virtual DSN address to physical location table to determine where the slices should be stored. Note that the virtual DSN address to physical location table may include both the current storage mode and the last storage mode to facilitate moving slices from the memory of the last mode to the memory in accordance with the current storage mode.

When the storage mode is mode B, the method continues to step 116 where the DS processing module sends the data slices to DS units with memory type B. When the storage mode is mode A, the method continues to step 122 where the DS processing sends the data slices to DS units with memory type A. Note that such decisions may be made on a data segment by data segment basis or for groupings of data segments (e.g., a data file).

When the storage mode is mode A/B, the method continues at step 118 where the DS processing module sends k slices to DS units with memory type B 118 and, at step 120, sends the other n-k slices to DS units with memory type A. Note that this scenario may include the metadata-indicated requirement for fast access (without failures), reliable memory with some cost constraint for the current time phase. Further note that when k is equal to or is greater than the read threshold, the DS processing unit can retrieve slices from the memory B without retrieving slices from memory A unless one or more slices from memory B is missing or corrupt.

After storing the slices, the method continues at step 124 where the DS processing module determines whether it is time to reassess the storage mode. Such a determination may be based on one or more of a time period has elapsed since the current storage mode, there have been no retrievals of the data object within a time period, a command, a request, and/or a memory type is filling up (e.g., memory B). Note that a likely scenario is starting with the B mode (e.g., fast and frequent data retrievals), transition to the A/B mode (e.g., less frequent, but still fast data retrievals), and then transition and remain at in mode A (e.g., less frequent and slower data retrievals).

Alternatively, or in addition to, the reassessing may be based on the occurrence of a condition to update the identification of the memory devices. The condition may include one or more of, but not limited to, updating of the storage metadata, a change of memory device characteristics, a change of available memory devices, and/or an occurrence of a triggering event. For example, the processing module may determine that the condition has occurred to update the dedication of the memory devices when new memory devices with more favorable memory characteristics relative to the storage requirements are available. The method continues with the step where the processing module re-identifies memory devices when the condition has occurred. In such an instance, the processing module may retrieve a portion of the plurality of data slices and facilitate moving the plurality of data slices to the re-identified memory devices.

If not reassessing, the method repeats at step 114. If reassessing, the method continues step 112 where the DS processing unit determines whether to change the storage mode. Such a change may be to move from storage mode B to storage mode A/B or to storage mode A. Other changes of the storage mode may also be determined, such as to change an operational parameter of the error coding dispersal storage function (e.g., number of pillars), which would revert the method to step 110.

Figure 8:
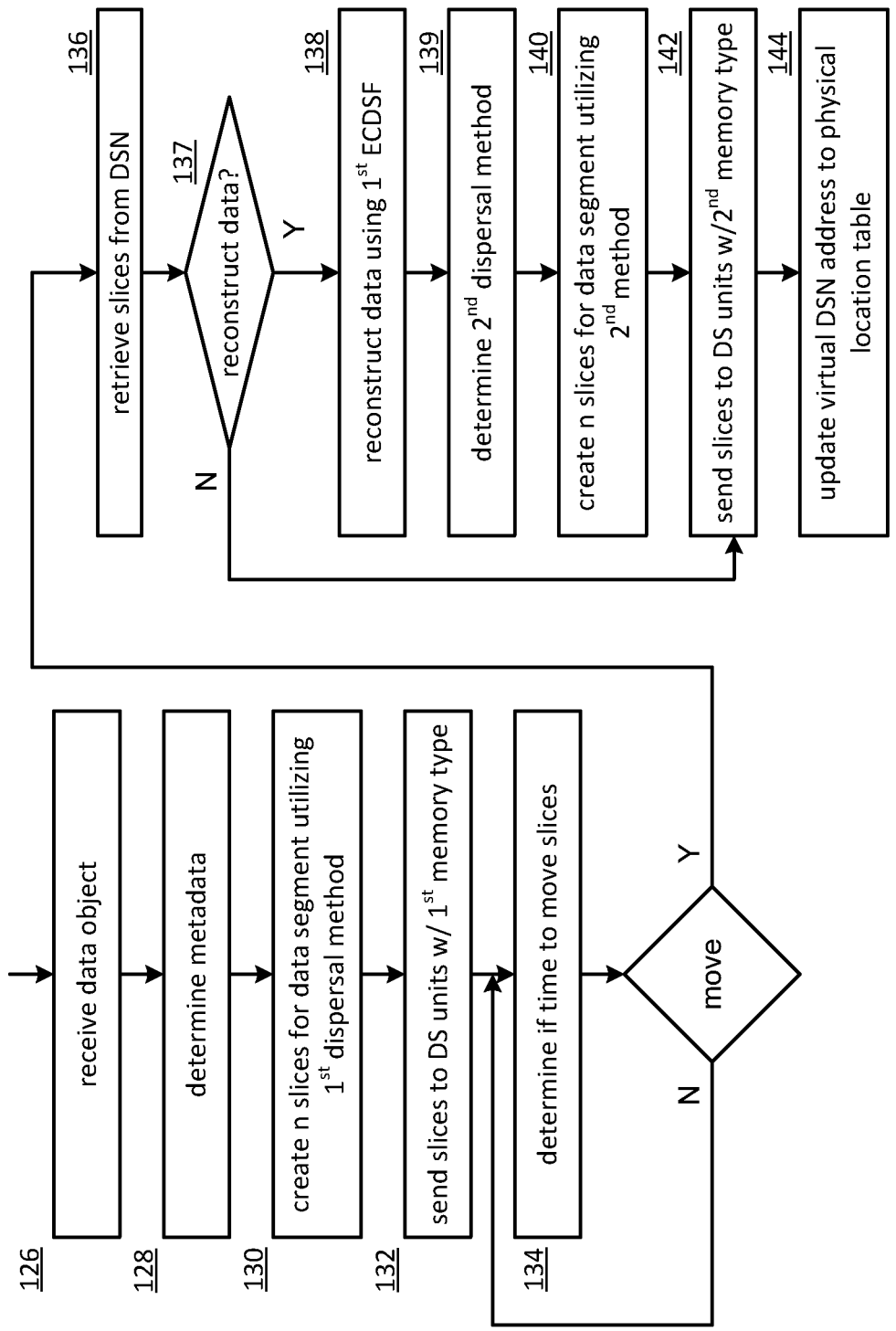
FIG. 8 is another flowchart of another embodiment of a method for determining data distribution in accordance with the present invention.

FIG. 8 is a flowchart illustrating a method that begins at step 126 where the DS processing module receives a data object from a source (e.g., a user device, the storage integrity processing unit, another DS processing unit, the DS unit, or the DS managing unit). The method continues at step 128 where the DS processing module determines metadata associated with the data object, which may be done in a similar manner as discussed with reference to step 108 of FIG. 7.

The method continues at step 130 where the DS processing module determines a first dispersal method in a manner similar to step 110 of FIG. 7. In addition, the DS processing module determines to store the slices in a DS units having a first type of memory (e.g., memory having a first set of memory capabilities). The method continues at step 132 where the DS processing module sends the slices to the DS units with the first memory type.

The method continues at step 134 where the DS processing unit determines whether it is time to move the slices from the first type of memory device to a second type of memory device. Such a determination may be based on one or more of, but not limited to, an elapsed time period of storage in the first type of memory, an elapsed time period since a data slice retrieval from the first type of memory, a first type of memory utilization indicator, a command, and/or a request. For example, the processing module may determine to transfer the plurality of data slices when the processing module determines that the elapsed time period of storage in the first type of memory exceeds a storage threshold.

The method repeats at step 134 when it is not time to move the slices. When it is time to move the slices, the method continues at step 136 where the DS processing module retrieves the slices from the DS units having memory of the first memory type. The method then continues at step 137 where the DS processing module determines whether to reconstruct data from the data slices. Such a determination may be based on the type of data, the second memory type, a change in the storage requirements (e.g., archiving, reduced retrieval needs, etc.), change in the operational parameters of the error coding dispersal storage function, and/or any other factor that would require the data to be reconstructed.

When the data is to be reconstructed, the method continues at step 138 the DS processing module reconstructs at least a portion of the data from the plurality of data slices in accordance with a first error coding dispersal function to produce reconstructed data. The first error coding dispersal function includes one or more of but not limited to an error coding type that includes at least one of an error coding algorithm, an encryption algorithm, and a compression algorithm and operational parameters that include two or more of a pillar width, a read threshold, a slicing parameter, an integrity check method, a caching settings, and a parallelism settings.

The method continues to step 139 where the DS processing module determines a second dispersal method (e.g., a second error coding dispersal storage function and identify the DS units having memory of the second type). The second error coding dispersal function includes one or more of, but not limited to, an error coding type that includes at least one of an error coding algorithm, an encryption algorithm, and a compression algorithm and operational parameters that include two or more of a pillar width, a read threshold, a slicing parameter, an integrity check method, a caching settings, and a parallelism settings. In an example, the second error coding dispersal function may include the error coding type that is substantially the same as the error coding type of the first error coding dispersal function. In another example, the second error coding dispersal function may include a different error coding type than that of the first error coding dispersal function. In yet another example, the second error coding dispersal function may include operational parameters that are substantially the same as the operational parameters of the first error coding dispersal function. In further example, the second error coding dispersal function may include different operational parameters than that of the first error coding dispersal function.

The method continues to step 140 where the DS processing module encodes the reconstructed data into a second plurality of slices in accordance with the second error coding dispersal storage function. The method continues at step 142 from step 140 (or from step 137 when the data is not to be reconstructed) where the DS processing module sends the slices (e.g., the original ones or the new ones) to DS units having memory of the second type. The method continues at step 144 where the DS processing module updates the virtual DSN address to physical location table to reflect where the slices are now stored. Note that the method of FIG. 8 may be applied on a data segment by data segment basis or for group of data segments (e.g., a data file). In the latter case, pluralities of data slices may be processed to reconstruct the data (e.g., reconstruct the data file) and then the reconstructed data (e.g., data file) is encoded to produce pluralities of slices encoded in accordance with the second error coding dispersal storage function.

Figure 9:
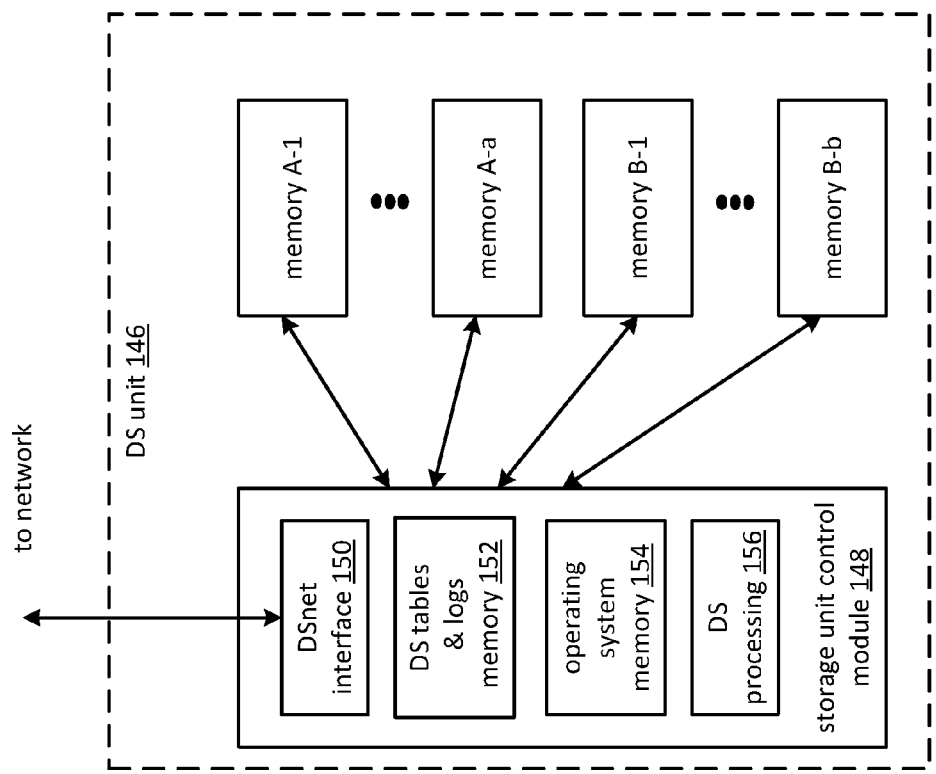
FIG. 9 is a schematic block diagram of an embodiment of a distributed storage unit in accordance with the invention.

FIG. 9 is a schematic block diagram of an embodiment of a distributed storage unit 146 (e.g., DS unit 36 &/or 95-104) that includes a storage unit control module 148, a plurality of memories of type A (1 through a), and a plurality of memories of type B (1 through b). The storage unit control module 148 includes the DSnet interface 150, an internal memory for DS tables and logs 152, a memory for the operating system (OS) 154, and the DS processing 156. The storage unit control module 148 may be operably coupled to the computing system via the DSnet interface 150 via the network.

The memories may be implemented as memory devices that are included in the DS storage unit 146 and/or outside of the DS storage unit 146. The memory devices may include but not limited to one or more of a magnetic hard disk, NAND flash, read only memory, optical disk, and/or any other type of read-only, and/or read/write memory. For example, memory A-1 may be implemented in the DS unit 146 and memory A-2 may be implemented in a remote server (e.g., a different DS unit operably coupled to the DS unit 146 via the network). In an example, memory A-1 through memory A-a are implemented with the magnetic hard disk technology and memory B-1 through memory B-b are implemented with the NAND flash technology. The memory devices may be associated with one or more memory device storage characteristics. Memory device storage characteristics may include one or more of but not limited to a memory device storage cost, a memory device storage access speed, memory device storage reliability, memory device storage availability, and/or a memory device storage capacity. The memory devices may further comprise main memory 54, a local non-main memory, and/or a non-local non-main memory 36.

The DS tables and logs memory 152 may be utilized to store operational data. The DS unit operational data may include one or more of but not limited to a DS table, a local virtual distributed storage network (DSN) address to physical memory table, a log, an activity record, a memory utilization record, an error record, a storage record, a retrieval record, and/or a vault information record. In other words, the DS unit operational data may be data that is used from time to time to operate the DS unit. The operating system memory 154 may be utilized to store a DS unit operating system algorithm. The DS unit operating system algorithm may include at least a portion of operating system executable software that is utilized to operate the DS unit.

In an example of a write operation, the DS processing of the DS unit receives an encoded slice to store. For example, the DS unit may receive an encoded slice from a user device for storage in the DS unit. The method begins with the step where the DS processing determines if the DS unit operating system is running. The method branches to the step where the DS processing selects one of the plurality of memory devices for storing the encoded slice when the DS processing determines that the DS unit operating system is running. The DS processing may retrieve slices of at least a portion of the operating system from one or more of the memories when the DS processing determines that the operating system is not running. The DS processing may decode the retrieved slices of the at least a portion of the operating system in preparation for execution as required.

The method continues with the step where the DS processing selects one of the plurality of memory devices for storing the encoded slice to produce a selected memory device based on one or more of but not limited to metadata associated with the encoded slice and a memory-based storage mode. The memory-based storage mode may include the memory selection and a time phase indicator. Such a selection may be based on one or more of the metadata, a command (e.g., from the DS processing unit indicating which memory type to use), a type of data indicator, a priority indicator, available memory, memory performance data, memory cost data, and/or any other parameter to facilitate desired levels of efficiency and performance. For example, the storage unit control module 148 may choose memory A-1 (e.g., a magnetic hard disk drive) to store the received EC data slice since the performance and efficiency is good enough for the EC data slice requirements (e.g., availability, cost, response time). In another example, the storage unit control module 148 distributes slices across the DS unit memories. In another example, the storage unit control module 148 distributes a read threshold k of the slices across memory B (for fast retrieval) and the other n-k slices across memory A. In yet another example, the storage unit control module 148 distributes the slices across the DS unit memories and at least one other DS unit at the same site as the DS unit 146. In yet another example, the storage unit control module 148 distributes the slices across the DS unit memories and at least one other DS unit at a different site as the DS unit 146.

The DS processing may determine if the operational data memory 152 is available. The DS processing may utilize the operational data from the operational data memory 152 when the DS processing determines that the operational data memory 152 is available. In an alternative, the DS processing may select one of the memory devices of the DS unit by retrieving data slices of the DS unit operational data from the memory devices to produce retrieved data slices when the DS processing determines that the operational data memory 152 is not available. The DS processing reconstructs vault information from the retrieved data slices in accordance with the error coding dispersal storage function. The DS processing selects one of the memory devices based on the vault information. In other words, the DS processing retrieves operational data to determine where to store the encoded slice. DS processing may update the operational data to produce updated operational data. The DS processing may encode the updated operational data to produce updated vault information data slices in accordance with the error coding dispersal storage function. The DS processing may store the updated vault information data slices in the memory devices. The DS processing of the DS unit stores the received encoded slice in the selected memory device. The DS processing may change the status of the operational data memory 152 to unavailable. The DS processing may deactivate the DS unit operating system and/or the operating system memory 154.

In an example of a read operation, the DS processing receives a read request for an encoded data slice. The method begins with the step where the DS processing determines if the DS unit operating system is running. The method branches to the step where the DS processing determines if the operational data memory 152 is available when the DS processing determines that the DS unit operating system is running.

The method continues with the step where the DS processing determines if the operational data memory 152 is available. The DS processing may retrieve slices of at least a portion of the operating system from one or more of the memories when the DS processing determines that the operating system is not running. The DS processing may decode the retrieved slices of the at least a portion of the operating system in preparation for execution as required.

The method continues with the step where the DS processing may determine if the operational data memory 152 is available. The DS processing may utilize the operational data (e.g., which memory device contains the encoded data slice to be retrieved) from the operational data memory 152 when the DS processing determines that the operational data memory 152 is available. The DS processing may select one of the memory devices of the DS unit where the encoded data slices stored by retrieving data slices of the DS unit operational data from the memory devices to produce retrieved data slices when the DS processing determines that the operational data memory 152 is not available. The DS processing reconstructs vault information from the retrieved data slices in accordance with the error coding dispersal storage function. The DS processing selects one of the memory devices based on the vault information. In other words, the DS processing retrieves operational data to determine where to retrieve the encoded slice.

The method continues with the step where the DS processing determines which memory device contains the encoded data slice to be retrieved based on the operational data. The DS processing retrieves the encoded data slice from the selected memory device. The DS processing outputs the encoded data slice to the requester via the DSnet interface 150. The DS processing may change the status of the operational data memory 152 to unavailable. The DS processing may deactivate the DS unit operating system and/or the operating system memory 154.

In an example of a slice transfer operation, the DS processing receives a request to transfer a slice from a first memory type to a second memory type. The method begins with the step where the DS processing determines if the DS unit operating system is running. The method branches to the step where the DS processing determines if the operational data memory 152 is available when the DS processing determines that the DS unit operating system is running.

The method continues with the step where the DS processing determines if the operational data memory 152 is available. The DS processing may retrieve slices of at least a portion of the operating system from one or more of the memories when the DS processing determines that the operating system is not running. The DS processing may decode the retrieved slices of the at least a portion of the operating system in preparation for execution as required.

The method continues with the step where the DS processing may determine if the operational data memory 152 is available. The DS processing may utilize the operational data (e.g., which memory device contains the encoded data slice to be transferred) from the operational data memory 152 when the DS processing determines that the operational data memory 152 is available. The DS processing may select one of the memory devices of the DS unit where the encoded data slices are stored by retrieving data slices of the DS unit operational data from the memory devices to produce retrieved data slices when the DS processing determines that the operational data memory 152 is not available. The DS processing reconstructs vault information from the retrieved data slices in accordance with the error coding dispersal storage function. The DS processing selects one of the memory devices based on the vault information. In other words, the DS processing retrieves operational data to determine where to retrieve the encoded slice.

The method continues with the step where the DS processing determines which memory device contains the encoded data slice to be retrieved based on the operational data. The DS processing retrieves the encoded data slice from the selected memory device. The DS processing determines which memory to transfer the encoded data slice to in response to the requester transfer. The determination may be based on one or more of a time period has expired since the last store, a command, an error message, a change in the memory architecture (e.g., a new memory device is added), and/or at least one of the DS tables, logs, and OS have changed. Having determined where to store the slice, the DS processing stores the slice in the selected memory. The DS processing updates and maintains a local virtual DSN address to physical memory table as part of the DS tables 152. The table maintains a record of where the slices are physically stored in the memories and associated the physical location to the slice name. The DS processing may change the status of the operational data memory 152 to unavailable. The DS processing may deactivate the DS unit operating system and/or the operating system memory 154.

Note that the storage unit control module 148 may utilize the DS processing 156 to distributedly store the DS tables, logs, and OS (e.g., that also utilize internal memory of the storage unit control module 148) to improve the reliability of operation of the DS unit 146. The DS unit 146 may subsequently retrieve and restore one or more of the DS tables, logs, and OS. The storage unit control module 148 may determine when to distributedly store one or more of the DS tables, logs, and OS.

Figure 10:
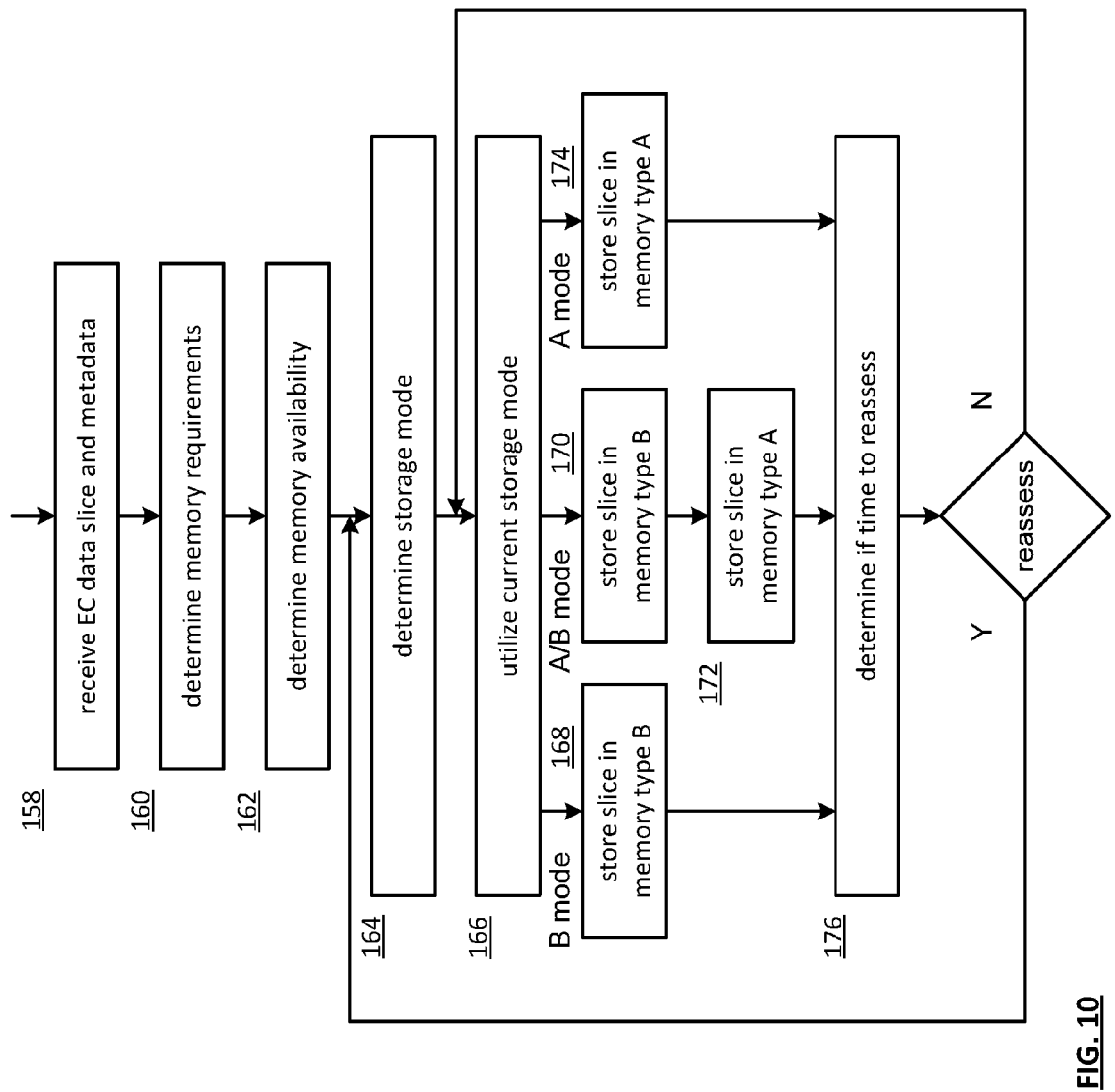
FIG. 10 is a flowchart of another embodiment of a method for determining data distribution in accordance with the present invention.

FIG. 10 is a flowchart illustrating the determination of a data storage method where a DS processing module of a DS unit may choose a memory to store a new slice and/or subsequently move a slice.

The method begins at step 158 where the DS processing module receives, via an interface module 150, an encoded data slice and metadata from a source (e.g., a user device, the storage integrity processing unit, the DS processing unit, another DS unit, and/or the DS managing unit 158). The DS processing unit (e.g., or another unit with DS processing) created the metadata associated with the data object as previously discussed with reference to FIG. 7.

The method continues at step 160 where the DS processing module determines the memory requirements based on the metadata. For example, the metadata may indicate a very high reliability requirement and a fast retrieval speed requirement for a near term time period. The DS processing module may subsequently choose the memory device that best matches the requirements.

The method continues at step 162 where the DS processing module determines memory availability. The determination may be based on one or more of but not limited to a query, a command, a message, and error message, and/or a table lookup. In an instance, the DS processing module may retrieve a plurality of data slices from at least some of the plurality of memory devices based on the encoded slice. In other words, the DS processing module retrieves the plurality of data slices that are associated with the encoded slice such as a vault identity. The DS processing module reconstructs DS operational data from the plurality of data slices in accordance with an error coding dispersal storage function. The DS operational data may include one or more of but not limited to a DS table, a local virtual distributed storage network (DSN) address to physical memory table, a log, an activity record, a memory utilization record, an error record, a storage record, a retrieval record, a vault information record. Within step 162 the DS processing module may further determine memory characteristics based on retrieving information previously stored in DS tables.

The method continues at step 164 where the DS processing module determines a storage mode based on the metadata and memory capabilities of the DS unit. The storage mode includes a memory selection and may further include a time phase indicator. The time phase indicator specifies one or more time intervals for a given set of storage requirements. For example, the time phase indicator specifies a first time phase that corresponds to a time period from the initial storage of the new data object and second time phase that corresponds to the time period after the first time phase expires. As a specific example, the DS processing module determines the storage mode to be a B mode (e.g., fast reliable and costly solid state memory) for the first time phase and storage mode A for the second time phase.

The DS processing module may also determine the storage mode based on the type of data. For example, the data may include customized data content (e.g., user preferences and/or files) and/or generic data content (e.g., a commonly available application). In this example, the generic data content may have one type of storage mode (e.g., slower, less reliable, etc.), while the customized data content may have another type of storage mode (e.g., faster, more reliable, etc.).

The method continues at step 166 where the DS processing module utilizes the current storage mode to store slices in the DS unit. In this instance, the DS processing module looks up the mapping in the DS operational data (e.g., a local virtual DSN address to physical location table) to determine where the slice should be stored. Note that the virtual DSN address to physical location table may include both the current storage mode and the last storage mode to facilitate moving slices from the memory of the last mode to the memory in accordance with the current storage mode.

When the storage mode is mode B, the method continues to step 166 where the DS processing module stores the data slice to a memory device with memory type B. When the storage mode is mode A, the method continues to step 174 where the DS processing stores the data slice to a memory device with memory type A. Note that such decisions may be made on a data segment by data segment basis or for groupings of data segments (e.g., a data file).

When the storage mode is mode A/B, the method continues at step 170 where the DS processing module stores the data slice to the memory device with memory type B and, at step 172, stores the data slice to the memory device with memory type A. Note that this scenario may include the metadata-indicated requirement for fast access (without failures) and reliable memory with some cost constraint for the current time phase. In other words, the data slice may be subsequently retrieved from the memory device of either memory type A or memory type B in accordance with a requirement of the retrieval.

After storing the slices, the method continues at step 176 where the DS processing module determines whether it is time to reassess the storage mode. Such a determination may be based on one or more of a time period has elapsed since the current storage mode, there have been no retrievals of the data slice within a time period, a command, a request, and/or a memory type is filling up (e.g., memory B). Note that a likely scenario is starting with the B mode (e.g., fast and frequent data retrievals), transition to the A/B mode (e.g., less frequent, but still fast data retrievals), and then transition and remain at in mode A (e.g., less frequent and slower data retrievals).

Alternatively, or in addition to, the reassessing may be based on the occurrence of a condition to update the identification of the memory devices. The condition may include one or more of, but not limited to, updating of the storage metadata, a change of memory device characteristics, a change of available memory devices, and/or an occurrence of a triggering event. For example, the DS processing module may determine that the condition has occurred to update the identification of the memory devices when new memory devices with more favorable memory characteristics relative to the storage requirements are available. The method continues with the step where the processing module re-identifies memory devices when the condition has occurred. In such an instance, the processing module may retrieve data slice and facilitate moving of the data slice to the re-identified memory device.

If not reassessing, the method repeats at step 166. If reassessing, the method continues step 164 where the DS processing module determines whether to change the storage mode. Such a change may be to move from storage mode B to storage mode A/B or to storage mode A.

Figure 11:
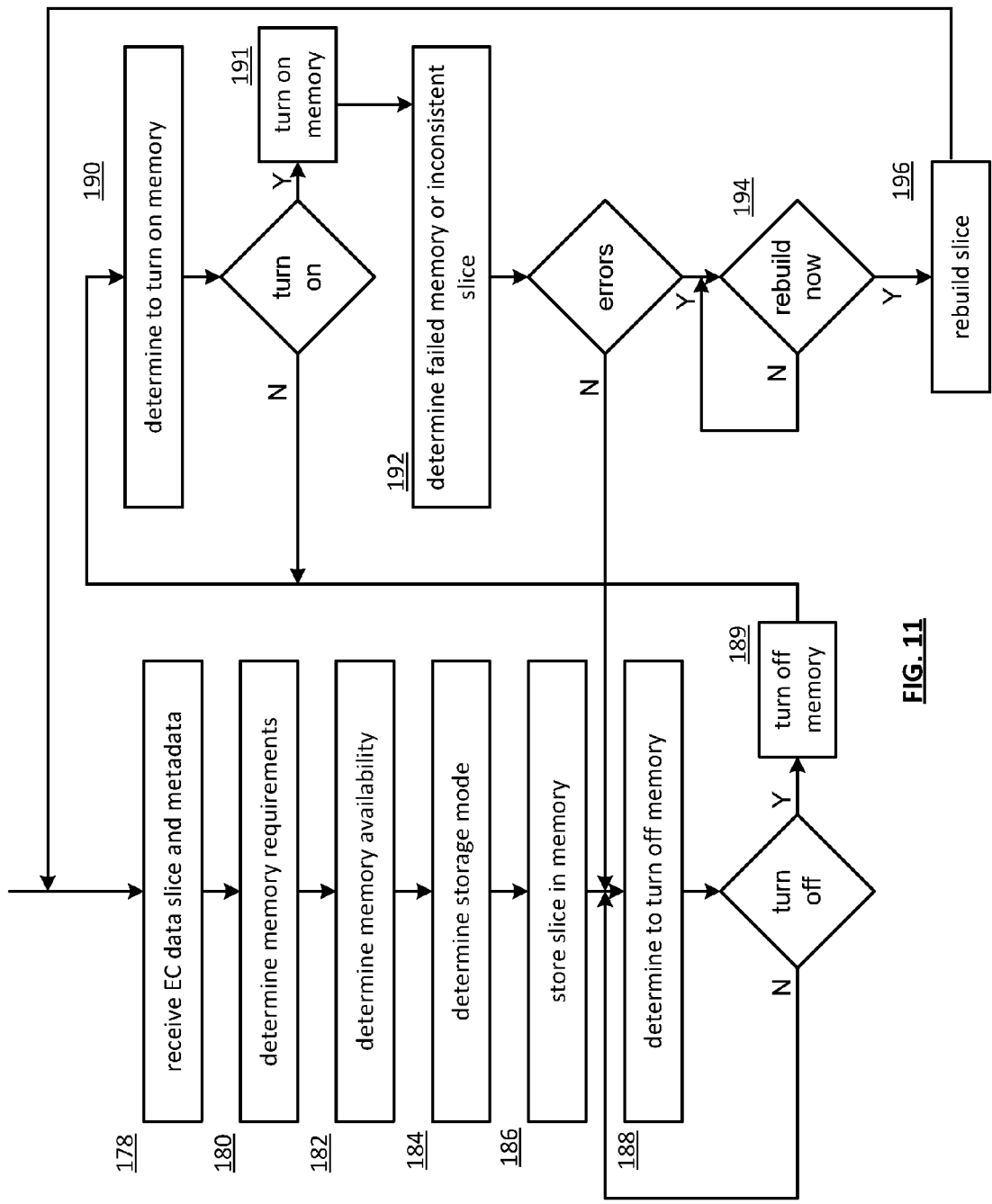
FIG. 11 is a flowchart of an embodiment of a method for memory device management in accordance with the present invention.

FIG. 11 is a flowchart illustrating the management of a memory device where the DS unit may power down a memory device that is not utilized often to extend the operational life of the memory device.

In an embodiment, the DS unit previously discussed with reference to FIG. 9 includes a plurality of memory devices. The plurality of memory devices includes a first set of memory devices (e.g., memory devices A-1 to A-a) that are continually active and a second set of memory devices (e.g., memory devices B-1 to B-b) that are selectively active. In an instance, the first set of memory devices store first data having a rate of retrieval in a first interval retrieval rate range and the second set of memory devices store second data having a rate of retrieval in a second interval retrieval rate range. For example, the first set of memory devices may be utilized when data is retrieved at a higher rate than the data retrieved from the second set of memory devices. In an instance, data is archived utilizing the second set of memory devices followed such that at least one memory device of the second set of memory devices may be de-activated from time to time. Note that the de-activation of a memory device may provide the system with a reliability improvement and/or power savings.

In an example of a store operation, the method begins with step 178 where the DS processing module 156 of the DS unit 146 receives an encoded slice and metadata from a source (e.g., a user device, the storage integrity processing unit, the DS processing unit, another DS unit, or the DS managing unit). The DS processing unit (e.g., or another unit with DS processing) created the metadata associated with the data object as previously discussed.

The method continues with step 180 where the DS processing module determines memory requirements as discussed with reference to step 160 of FIG. 10. For example, the metadata may indicate a very high reliability requirement and a fast retrieval speed requirement for the near term time period. In another example, the metadata may indicate a very long period of storage with few retrievals requirement (e.g., records archive). The DS processing module may subsequently choose the memory that best matches those requirements as described below.

The method continues with step 182 where the DS processing module determines memory availability as discussed with reference to step 162 of FIG. 10. The method continues with step 184 where the DS processing module determines the storage mode based on one or more of but not limited to the memory requirements, the memory availability, and/or memory characteristics. The storage mode may include the memory selection and a time phase indicator. The time phase may include a first phase to include the time period between the initial storage of the new slice until the time when the memory is to be powered off. Note that other time phases may comprise a subsequent phase to include the time period between the last power down until the time when the memory power is to be turned back on to perform memory tests. For example, the DS processing module determines the storage mode to be a long term archive after a ten day first time phase after the initial slice storage when subsequent retrievals may be frequent. The DS processing module may update the local virtual DSN address to physical location table to reflect where the slice will be stored.

The method continues with step 186 where the DS processing module stores the encoded slice in the one of the second set of memory device when the encoded slice is to be stored in the one of the second set of memory devices. The DS processing module may de-activate the one of the second set of memory devices, in accordance with a deactivation protocol, after storing the encoded slice. The deactivation protocol may include one or more of but not limited to elapsed time since storing the encoded slice in the one of the second set of memory devices, elapsed time since a retrieval request for the encoded slice, elapsed active state time of the one of the second set of memory devices, a command, an irregular power indicator, an earthquake indicator, a bad weather indicator, a retrieval frequency indicator, and/or an indicator to improve the life of the memory device.

In another embodiment, the DS processing module stores the encoded slice in the one of the first set of memory devices when the encoded slice is to be stored in the one of the first set of memory devices. The DS processing module may determine whether to transfer the encoded slice from the one of the first set of memory devices to the one of the second set of memory devices based a data transfer protocol (e.g., how much time later, a condition of transfer etc.). For example, the processing unit may determine to transfer the encoded slice when a time period has elapsed its initial storage of the encoded slice in the one of the first set of memory devices. The processing unit may retrieve the encoded slice from the one of the first set of memory devices and store the encoded slice in the one of the second set of memories when the processing unit determines that the encoded slice is to be transferred.

The method continues with step 188 where the DS processing module determines when to de-activate (e.g., turn off) the memory device to produce a de-activated memory device. The determination may be based on one or more of but not limited to elapsed time since a retrieval request for at least a portion of the second data, elapsed time since a store request for at least a portion of the second data, elapsed active state time of the memory device, a command, an irregular power indicator, an earthquake indicator, a bad weather indicator, a retrieval frequency indicator, and/or an indicator to improve the life of the memory device. If not turning off the memory, the method repeats at step 188. If turning off the memory, the method continues to step 189 where the DS processing module turns off the memory.

The method continues with step 190 where the DS processing module determines when to activate (e.g., turn on) the memory. The DS processing module determines when to activate the memory device (e.g., of the second set) based on one or more of but not limited to a retrieval request for at least a portion of the second data, elapsed inactive state time of the memory device of the second set, a command, an irregular power indicator, an earthquake indicator, a bad weather indicator, a retrieval frequency indicator, and/or an indicator to improve the life of the memory device. Note that the memory may be activated to perform integrity and consistency checks of the stored slices. If not turning on the memory, the method repeats at step 190. If turning on the memory, the method continues to step 191 where the DS processing module turns on the memory. The DS processing module may retrieve the encoded slice and/or slice information from the activated memory device. The slice information may include one or more of but not limited to an encoded slice, content data, error control information, a hash of a slice name list, a slice name list, a source name list, a hash of a source name list, and/or a slice revision.

The method continues with step 192 where the DS processing module determines whether the retrieved encoded slice has an error (e.g., failed memory or slice inconsistency). The determination may be based on one or more of but not limited to a missing slice test, an outdated slice revision test, a slice name comparison to at least one other slice name from a slice name list, a slice revision comparison to at least one other slice revision from a slice revision list, a slice name comparison to at least one other slice name from another DS unit, a slice revision comparison to at least one other slice revision from another DS unit, and/or a stored checksum comparison to a re-calculated checksum.

The method returns to step 188 to determine when to turn the memory off when the DS processing module does not detect any errors. In this instance, the DS processing module may determine a condition for the previous activation of the memory device when the retrieved encoded slice does not have an error. In other words, the DS processing module determines why the memory device was activated (e.g., to check for errors and/or to retrieve an encoded slice). The DS processing module sends, via an interface module, the retrieved encoded slice and initiates deactivation of the memory device when the condition was a data access request (e.g., to retrieve and encoded slice). The DS processing module initiates the deactivation of the memory device when the condition was verification-based (e.g., to check for errors).

The method continues to step 194 where the DS processing module determines when to rebuild the slices with errors when the DS processing module detects errors. The rebuild determination may be based on one or more of memory device availability (e.g., may be waiting for a replacement hard disk drive to be installed), a command, a timer, and/or a substitute memory becoming available. If not rebuilding, the method repeats at step 194. If rebuilding, the method continues to step 196 where the DS processing module rebuilds and stores the recreated slice. The DS processing module retrieves good slices of the same segment from the other pillar DS units, de-slices, and decodes to produce the original data object. The DS processing module recodes and re-slices the original data object to produce repaired slices for the one or more slices that were in error. The DS processing module stores the repaired slices in the DS unit memory and updates the local virtual DSN address to physical location table if there are any changes (e.g., when a substitute memory is utilized). The DS processing module may de-activate the activated memory device (e.g., right away or on a delayed basis).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by a dispersed storage (DS) unit comprises:
    when the DS unit has at least one of DS unit operational data and DS unit operating system algorithm to store:
        encoding at least a portion of the at least one of DS unit operational data and DS unit operating system algorithm in accordance with an error coding dispersal storage function to produce a plurality of data slices; and
        storing at least some of the plurality of data slices in memory devices of the DS unit in accordance with the error coding dispersal storage function; and
    when the DS unit has an encoded slice of content data to store:
        selecting one of the memory devices of the DS unit for storing the encoded slice based on metadata associated with the encoded slice and on the DS unit operational data to produce a selected memory device; and
        storing the encoded slice in the selected memory device.

2. The method of claim 1, wherein the DS unit operational data comprises at least one of:
    a DS table;
    a local virtual distributed storage network (DSN) address to physical memory table;
    a log;
    an activity record;
    a memory utilization record;
    an error record;
    a storage record;
    a retrieval record; and
    a vault information record.

3. The method of claim 1, wherein the storing at least some of the plurality of data slices further comprises:
    determining a memory device requirements for the storing of the at least some of the plurality of data slices in the memory devices based on metadata; and identifying the memory devices based on the memory device requirements.

4. The method of claim 3, wherein the metadata comprises at least one of:
   a data type;
   a data size;
   a data priority;
   a data security index;
   an estimated storage time;
   an estimated time between retrievals; and
   a storage requirement.

5. The method of claim 1, wherein the storing of the at least some of the plurality of data slices in the memory devices further comprises:
   storing at least a read threshold number of the plurality of data slices in a first set of the memory devices; and
   storing remaining data slices of the plurality of data slices in a second set of the memory devices.

6. The method of claim 1 further comprises:
   when the DS unit has at least one of DS unit operational data and DS unit operating system algorithm to store:
      storing a remaining one of the plurality of data slices in a memory device of another DS unit in accordance with the error coding dispersal storage function.

7. A dispersed storage (DS) unit comprises:
   a plurality of memory devices;
   a dispersed storage processing unit operable to:
      when at least one of DS unit operational data and DS unit operating system algorithm is to be stored:
         encode at least a portion of the at least one of DS unit operational data and DS unit operating system algorithm in accordance with an error coding dispersal storage function to produce a plurality of data slices; and
         store at least some of the plurality of data slices in memory devices of the DS unit in accordance with the error coding dispersal storage function; and
      when an encoded slice of content data is to be stored:
         select one of the plurality of memory devices for storing the encoded slice based on metadata associated with the encoded slice and on the DS unit operational data to produce a selected memory device; and
         store the encoded slice in the selected memory device.

8. The DS unit of claim 7, wherein the DS unit operational data comprises at least one of:
   a DS table;
   a local virtual distributed storage network (DSN) address to physical memory table;
   a log;
   an activity record;
   a memory utilization record;
   an error record;
   a storage record;
   a retrieval record; and
   a vault information record.

9. The DS unit of claim 7, wherein the dispersed storage processing unit further functions to store at least some of the plurality of data slices by:
   determining a memory device requirements for the storing of the at least some of the plurality of data slices in the memory devices based on metadata; and
   identifying the memory devices based on the memory device requirements.

10. The DS unit of claim 9, wherein the metadata comprises at least one of:
   a data type;
   a data size;
   a data priority;
   a data security index;
   an estimated storage time;
   an estimated time between retrievals; and
   a storage requirement.

11. The DS unit of claim 9, wherein the dispersed storage processing unit further functions to store at least some of the plurality of data slices in the memory devices by:
   storing at least a read threshold number of the plurality of data slices in a first set of the memory devices; and
   storing remaining data slices of the plurality of data slices in a second set of the memory devices.

12. The DS unit of claim 7 further comprises:
   an interface module; and
   wherein the dispersed storage processing unit further functions to:
      when the DS unit has at least one of DS unit operational data and DS unit operating system algorithm to store:
         outputting, via the interface module, a remaining one of the plurality of data slices to a memory device of another DS unit in accordance with the error coding dispersal storage function.

13. A dispersed storage (DS) unit comprises:
   an interface module operable to receive an encoded slice of content data;
   a plurality of memory devices; and
   a processing unit operable to:
      determine that the encoded slice is to be stored based on metadata;
      retrieve a plurality of data slices from at least some of the plurality of memory devices based on the encoded slice;
      reconstruct DS operational data from the plurality of data slices in accordance with an error coding dispersal storage function;
      selecting one of the plurality of memory devices for storing the encoded slice based on the DS operational data to produce a selected memory device; and
      storing the encoded slice in the selected memory device.

14. The DS unit of claim 13, the processing unit further functions to:
   update the DS operational data to produce updated DS operational data when the encoded slice is stored;
   construct a second plurality of data slices from the updated DS operational data in accordance with the error coding dispersal storage function; and
   output, via the interface module, the second plurality of data slices in at least some of the plurality of memory devices based on the encoded slice.

15. The DS unit of claim 13, wherein the DS operational data comprises at least one of:
   a DS table;
   a local virtual distributed storage network (DSN) address to physical memory table;
   a log;
   an activity record;
   a memory utilization record;
   an error record;
   a storage record;
   a retrieval record; and
   a vault information record.

* * * * *